US009781232B2

(12) United States Patent
Tsuchiya et al.

(10) Patent No.: US 9,781,232 B2
(45) Date of Patent: Oct. 3, 2017

(54) SERVER APPARATUS AND INFORMATION PROCESSING APPARATUS

(75) Inventors: Kazuhisa Tsuchiya, Nagano (JP); Yasuo Nomura, Nagano (JP)

(73) Assignee: SONY CORPORATION, Tokyo (JP)

( * ) Notice: Subject to any disclaimer, the term of this patent is extended or adjusted under 35 U.S.C. 154(b) by 438 days.

(21) Appl. No.: 14/124,334

(22) PCT Filed: Jun. 26, 2012

(86) PCT No.: PCT/JP2012/004109
§ 371 (c)(1),
(2), (4) Date: Dec. 6, 2013

(87) PCT Pub. No.: WO2013/001783
PCT Pub. Date: Jan. 3, 2013

(65) Prior Publication Data
US 2014/0095594 A1   Apr. 3, 2014

(30) Foreign Application Priority Data

Jun. 30, 2011 (JP) .................................. 2011-146173

(51) Int. Cl.
*G06F 15/16* (2006.01)
*H04L 29/06* (2006.01)
(Continued)

(52) U.S. Cl.
CPC .............. *H04L 67/42* (2013.01); *G06Q 30/02* (2013.01); *G06Q 30/0601* (2013.01)

(58) Field of Classification Search
CPC ..... G06Q 30/02; G06Q 30/0601; H04L 67/42
(Continued)

(56) References Cited

U.S. PATENT DOCUMENTS 6,144,990 A *  11/2000  Brandt ................ G06F 17/3089
                                                707/999.01
6,742,059 B1 *  5/2004  Todd ..................... H04L 41/046
                                                709/219
(Continued)

FOREIGN PATENT DOCUMENTS

JP           11-68823 A       3/1999
JP        2002-209204 A       7/2002
(Continued)

OTHER PUBLICATIONS

International Search Report issued Oct. 2, 2012, in PCT/JP2012/004109.

*Primary Examiner* — Moustafa M Meky
*Assistant Examiner* — Thorne E Waugh
(74) *Attorney, Agent, or Firm* — Oblon, McClelland, Maier & Neustadt, L.L.P.

(57) ABSTRACT

An apparatus includes a receiving unit, a determining unit, and a reply unit. The receiving unit is configured to receive a request for service information from an information processing apparatus via a network. The determining unit is configured to determine the service information based on the request, where the service information includes information associated with accessing a service and display object information on a display object corresponding to the service. The reply unit is configured to send the service information to the information processing apparatus.

16 Claims, 15 Drawing Sheets

(51) Int. Cl.
   *G06Q 30/02* (2012.01)
   *G06Q 30/06* (2012.01)
(58) Field of Classification Search
   USPC .................................................. 709/203–248
   See application file for complete search history.

(56) References Cited

U.S. PATENT DOCUMENTS

| | | | |
|---|---|---|---|
| 7,562,287 B1* | 7/2009 | Goldstein | G06Q 30/02 |
| | | | 715/201 |
| 7,693,871 B2* | 4/2010 | Barrs, II | G06F 17/30017 |
| | | | 707/999.107 |
| 7,712,123 B2* | 5/2010 | Miyaoku | H04N 7/17318 |
| | | | 369/2 |
| 2001/0039519 A1* | 11/2001 | Richards | G06Q 30/02 |
| | | | 705/7.35 |
| 2002/0055966 A1* | 5/2002 | Border | G06F 17/30902 |
| | | | 709/200 |
| 2003/0051252 A1 | 3/2003 | Miyaoku et al. | |
| 2005/0091111 A1* | 4/2005 | Green | G06Q 30/0262 |
| | | | 705/14.59 |
| 2005/0204024 A1* | 9/2005 | Asami | G06Q 30/02 |
| | | | 709/223 |
| 2005/0257056 A1* | 11/2005 | Morita | G06F 21/10 |
| | | | 713/170 |
| 2010/0070876 A1* | 3/2010 | Jain | G06Q 30/02 |
| | | | 715/748 |
| 2010/0107150 A1* | 4/2010 | Kamada | G06F 8/65 |
| | | | 717/170 |
| 2010/0332996 A1* | 12/2010 | Sarkaria | G06F 8/60 |
| | | | 715/748 |
| 2011/0119345 A1 | 5/2011 | Chopra et al. | |

FOREIGN PATENT DOCUMENTS

| | | | |
|---|---|---|---|
| JP | 2004272888 A | * | 9/2004 |
| JP | 2004348455 A | * | 12/2004 |
| JP | 2005-123884 A | | 5/2005 |
| JP | 2011-108241 A | | 6/2011 |

* cited by examiner

225 Service information database

21 Storage service information

| Service ID | Name | Information-on-icon | Query-generating script |
|---|---|---|---|
| | | | |
| | | | |

...

22 Category/service connecting information

| Content category | Action category | Service ID |
|---|---|---|
| | | |
| | | |

...

23 Service-supported country information

| Service ID | Supported country |
|---|---|
| | |
| | |

Service-information-obtain request

```
{
 "AFFILIATE_LIST_REQUEST":
 [
  {
   "DEVICE_TYPE" : "COMPUTER",
   "DEVICE_ID" : "0123456789ABCDEFGHIJKLM",
   "LOCALE" : "jp",
   "LANGUAGE" : "ja.jp",
   "APP_ID" : "XXXXV1234",
   "CONTENT_CATEGORY" : "MUSIC",
   "ACTION_CATEGORY" : "PURCHASE",
   "CONTENT_KEY" : "PPPQQQ12345",
   "CONTENT_KEY" , "arigato"
   "MATCH_COUNT" : 5,
   "RANGE_START" : 1,
  }
 ]
}
```

FIG.9

Service-information-obtain reply

```
{
  "resultCount" : 3,
  "results" :
  [
    {
      "ACTION_CATEGORY" : "PURCHASE",
      "TITLE" : "City Music",
      "IMAGE_SIZE" : "SMALL",
      "DATA_TYPE" : "IMAGE_JPEG",
      "VALUE" : "xxxxxxxxxxxxxxxxxxxx ………",
      "SERVICE_QUERY" : "YES",
      "DATA_TYPE" : "HTTP REQUEST",
      "VALUE" : "http://music.affiservice.com/result?search_query=PPPQQQ12345+arigato&ja_JP",
    },
    {
      (Other service information)
    }
  ]
}
```

FIG.11

```
{
  "RESULTS" : 3
  [
    {
      "DATE_RELEASE" : "20 April 2008",
      "CONTENT_KEY", "PPPQQQ12345",
      "CONTENT_KEY", "arigato",
      "CONTENT_KEY", "abcdefg"
      "PURCHASE_URL" :
        "http://music.affiservice.com/jp/album/arigato/id6577365?i=6577341&uo=4",   ⎫ 41
      "PREVIEW_URL" :
        "http://music.affiservice.com/jp/album/arigato/id6577365?i=6577341&po=1"   ⎫ 42
    }
  ]
}
```

FIG.16

SERVER APPARATUS AND INFORMATION PROCESSING APPARATUS

TECHNICAL FIELD

The present technology relates to a server apparatus and an information processing apparatus that provide a GUI (Graphical User Interface) environment that makes services provided in a web user-friendly in the information processing apparatus as a client apparatus.

BACKGROUND ART

Recently, there are various modes of service provided on the web. For example, in a case of multimedia products such as music and moving images, there are provided a reproduction service for those multimedia products, a purchase service, and, in addition, a sharing service typified by an SNS (Social Networking Service) and the like with which people share information on the multimedia products with their friends.

Along with the improvement of services provided in the web, attempts are made to make those services user-friendly. For example, Patent Literature 1 discloses a terminal capable of displaying service-selection icons on a homepage. The service-selection icons have information on service content of a service providing information capable of being browsed in the web, information on a provider, and the like. By clicking a service-selection icon that a user wishes to use by using the terminal, the service may be provided by the service provider corresponding to the service-selection icon.

CITATION LIST

Patent Literature

PTL 1: Japanese Patent Application Laid-open No. H11-068823 (paragraphs [0125]-[0126] (FIG. 6))

SUMMARY OF INVENTION

Meanwhile, with regard to services provided on the web, there may be a number of changes of an access-target URL (Uniform Resource Locator), service-target content, service content, and the like. Therefore, a service-selection GUI including service-selection icons and the like disclosed in, for example, Patent Literature 1 will be in an environment in which icons enabling access to services correctly and icons disabling access to services correctly are mixed because of deterioration of freshness, and thus may thus seriously degrade operability. Therefore, in order to maintain a preferable GUI environment continuously, it is necessary to periodically change the design of the service-selection GUI program installed in a client apparatus and the like. There is a problem that it costs to change the design, as a matter of course. It also costs to re-distribute the program and the like.

In view of the above-mentioned circumstances, it is desirable to provide a server apparatus and an information processing apparatus capable of responding to changes of services flexibly and efficiently.

Accordingly, the present invention broadly comprises an apparatus, a method, and a non-transitory computer readable medium encoded with a program which causes the processor to perform the method. In one embodiment, the apparatus includes a receiving unit, a determining unit, and a reply unit. The receiving unit is configured to receive a request for service information from an information processing apparatus via a network. The determining unit is configured to determine the service information based on the request, where the service information includes information associated with accessing a service and display object information on a display object corresponding to the service. The reply unit is configured to send the service information to the information processing apparatus.

(deletion)

BRIEF DESCRIPTION OF DRAWINGS

FIG. 7 is a diagram showing information stored in a service information database of the cloud server.

FIG. 9 is a diagram showing an example of the service-information-obtain request.

FIG. 11 is a diagram showing an example of the service-information-obtain reply.

FIG. 16 is a diagram showing an example of reply data from a service provider server.

DESCRIPTION OF EMBODIMENTS

Hereinafter, embodiments according to the present technology will be described with reference to the drawings.

<First Embodiment>

Figure 1:
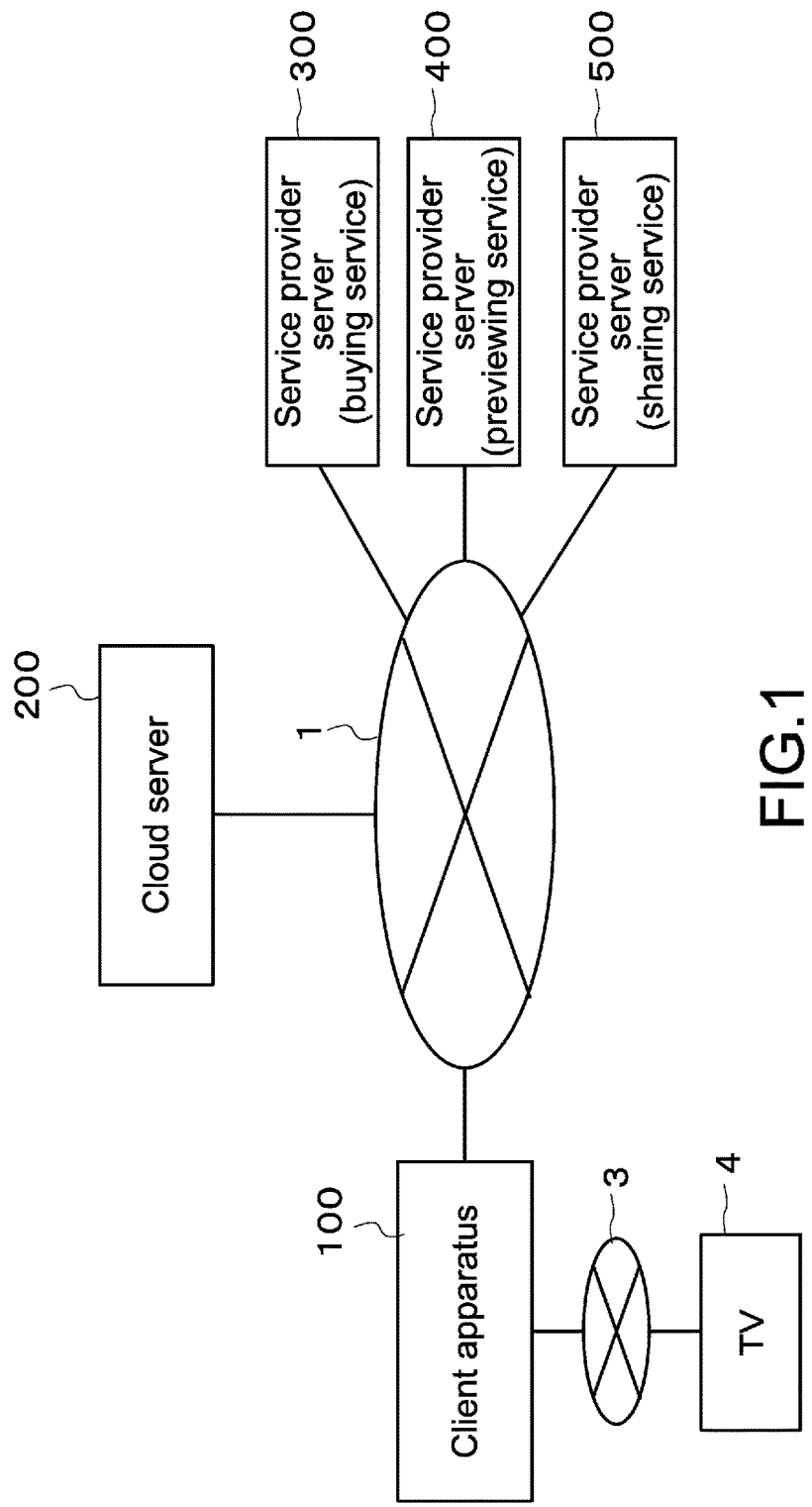
FIG. 1 is a diagram showing the network system configuration according to a first embodiment of the present technology.

FIG. 1 is a diagram showing a configuration of a network system according to a first embodiment of the present technology.

The network system includes a client apparatus 100 as an information processing apparatus, and a cloud server 200 that provides cloud services to a user of the client apparatus 100. The client apparatus 100 is specifically a consumer device such as a personal computer, a game device, or a mobile phone. The cloud server 200 is, specifically, a personal computer, a server computer, or the like. The client apparatus 100 and the cloud server 200 are connected to each other via a global network 1 such as the Internet. The network 1 is capable of connecting to service provider servers 300, 400, 500 providing various services such as a buying service with which users are capable of buying content such as music, movies (moving images), books, and the like, a previewing service with which users are capable of previewing content, and a sharing service typified by an SNS. Meanwhile, the client apparatus 100 is capable of connecting to a digital television apparatus 4 provided in the same home via a home network 3.

(Client Apparatus Configuration)

Figure 2:
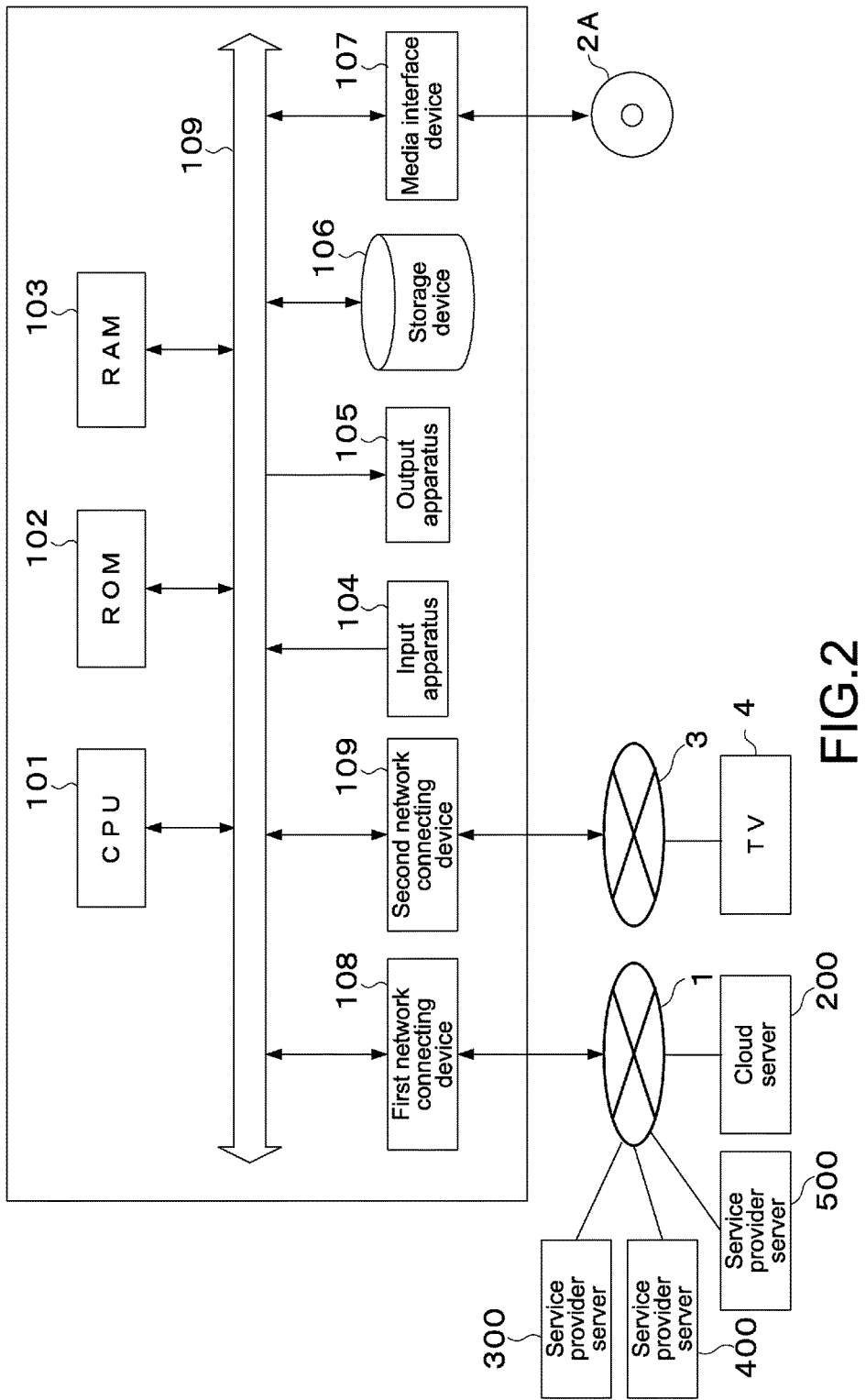
FIG. 2 is a block diagram showing the hardware configuration of a client apparatus.

The client apparatus 100 has a configuration of, for example, the following typical computer system or the like. FIG. 2 is a block diagram showing the hardware configuration of the client apparatus 100.

As shown in FIG. 2, the client apparatus 100 includes a CPU (Central Processing Unit) 101, a ROM (Read Only Memory) 102, and a RAM (Random Access Memory) 103. Further, the client apparatus 100 includes an input apparatus 104, an output apparatus 105, a storage device 106, a media interface device 107, a first network connecting device 108, a second network connecting device 109, and a bus 110 connecting them to each other.

The CPU 101 functions as an arithmetic processing unit and a control unit, and controls overall behaviors of the client apparatus 100 based on various programs. The ROM 102 stores the programs, arithmetic parameters, and the like that the CPU 101 uses. The RAM 103 temporarily stores the programs executed by the CPU 101, parameters arbitrarily changed during execution of the programs, and the like.

The input apparatus 104 includes input means, an input control circuit, and the like. A user inputs information with the input means such as a mouse, a keyboard, a touchpad, buttons, a microphone, a switch, and a lever. The input control circuit generates input signals based on input from a user, and outputs the input signals to the CPU 101. By operating the input apparatus 104, a user of the client apparatus 100 is capable of inputting various data to the CPU 101 and instructing handling operations.

The output apparatus 105 includes a display apparatus such as, for example, a CRT (Cathode Ray Tube) display device, a Liquid Crystal Display (LCD) device, an OLED (Organic Light Emitting Diode) device, and a lamp. Further, the output apparatus 105 includes a sound output device such as a speaker and headphones.

The storage device 106 is a device for storing programs and user data. The storage device 106 includes a storage medium, a read/write device reading/writing data out of/in the storage medium, and the like. The storage device 106 includes, for example, an HDD (Hard Disk Drive), an SSD (Solid State Drive), and the like.

The media interface device 107 is a reader/writer for a storage medium. The media interface device 107 reads/writes data out of/in a removable recording medium 2A such as a mounted magnetic disk, optical disk, magnetic optical disk, or a semiconductor memory.

The first network connecting device 108 is an interface for connecting to, for example, the network 1. The first network connecting device 108 may be a device for a wireless LAN (Local Area Network), a device for a wireless USB, or a wired communication device for wired communication.

The second network connecting device 109 is an interface for connecting to, for example, the home network 3. The second network connecting device 109 may also be a device for a wireless LAN (Local Area Network), a device for a wireless USB, or a wired communication device for wired communication. Note that one network connecting device may include the first network connecting device 108 and the second network connecting device 109 by using a router or an access point.

Next, the functional configuration of the client apparatus 100 will be described.

Figure 3:
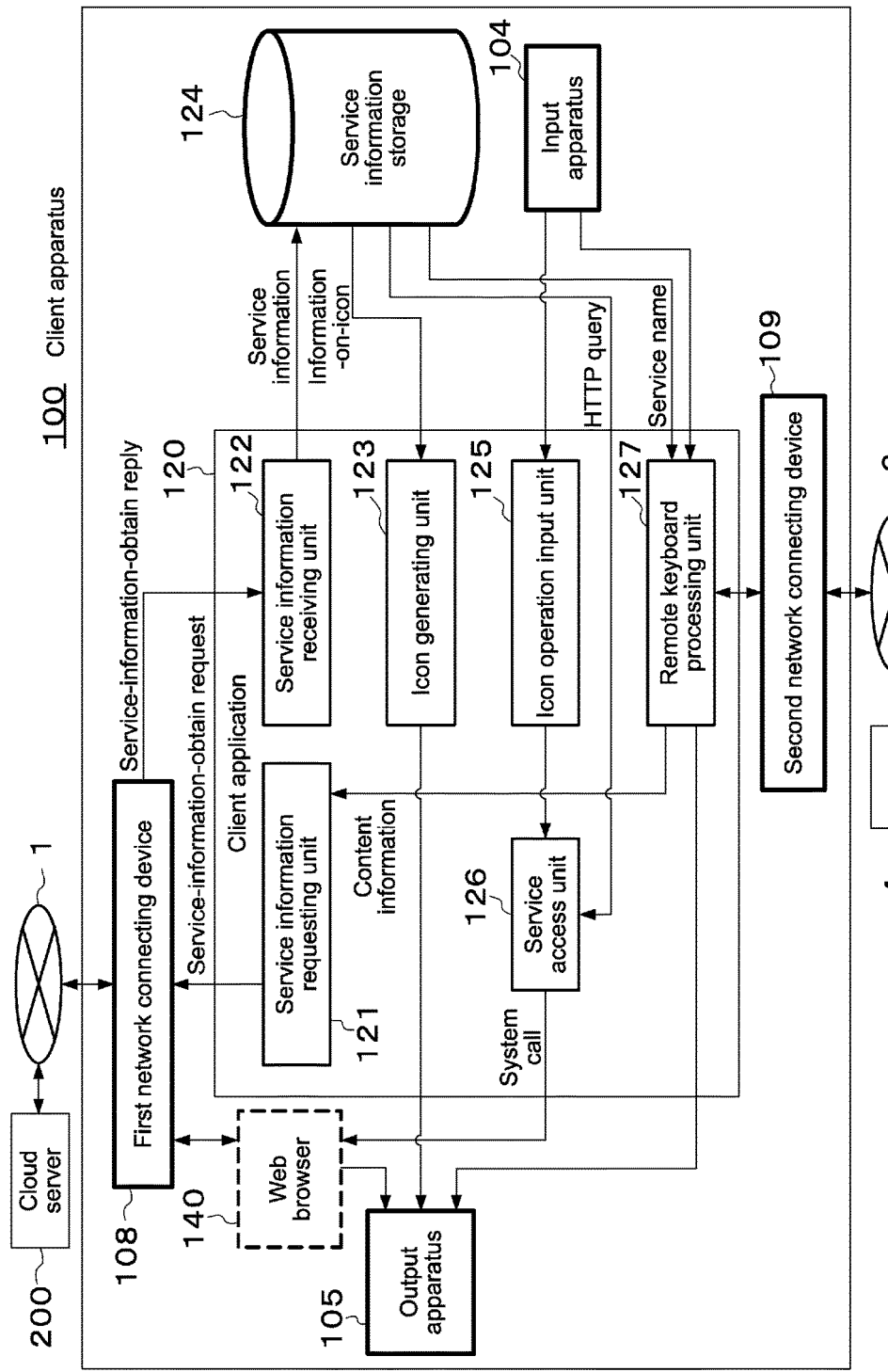
FIG. 3 is a block diagram showing the functional configuration of the client apparatus.

FIG. 3 is a block diagram showing the functional configuration of the client apparatus 100.

The client apparatus 100 includes a service information requesting unit 121 (request sending unit), a service information receiving unit 122 (service-information obtaining unit), an icon generating unit 123, an icon operation input unit 125, a service access unit 126, and a remote keyboard processing unit 127 (content information obtaining unit). They are functions implemented in a client application 120, and executed by the CPU 101. The storage device 106 stores programs such as an OS (Operating System), and in addition, application programs operating in the OS, such as a web browser 140 and the client application 120. The client application 120 recorded in the removable recording medium 2A is read by the media interface device 107 and installed in the storage device 106, and the client application 120 is thus capable of being used in the client apparatus 100.

The service information requesting unit 121 sends a service-information-obtain request for requesting to obtain service information from the cloud server 200. The service-information-obtain request includes, as service-select information, a device type, a device ID, country information, a client application ID, a content category, an action category, a content key, and the like. Here, the content category and the content key are collectively referred to as "information-on-content". The content key is a search key used to search for content such as an ID, title, artist name, or album name of content.

The service information receiving unit 122 receives service information from the cloud server 200 in response to the service-information-obtain request, and stores the service information in a service information storage 124. The service information includes an HTTP (Hypertext Transfer Protocol) query which is access information necessary to access a service, information-on-icon corresponding to the service, and the like. The information-on-icon includes information on an icon image, service name information corresponding to the icon, and the like. The information on an icon image includes, specifically, size information on the icon image, image data of the icon, the data format, and the like.

The icon generating unit 123 executes processing of displaying an icon by using information-on-icon included in service information stored in the service information storage 124.

The icon operation input unit 125 accepts, via the input apparatus 104, operations (focus movement, selection) by a user with respect to an icon displayed on the output apparatus 105, and notifies the service access unit 126 of the operations. Selection of an icon is performed as follows. By operating the input apparatus 104 of a coordinate input system such as, for example, a mouse or cursor keys, the focus is moved to a target icon, and then a click operation or the like is performed.

The service access unit 126 executes processing of access to a service corresponding to an icon selected by a user. More specifically, the service access unit 126 obtains an HTTP query with respect to a service corresponding to an icon selected by a user from the service information storage 124, and executes a system call to start the web browser 140 by using the HTTP query as a parameter.

The remote keyboard processing unit 127 is used as means for providing information-on-content to the service information requesting unit 121. Next, the remote keyboard processing unit 127 will be described in detail.

The remote keyboard processing unit 127 enables operations of the digital television apparatus 4 connected via the home network 3, input of characters, and the like by using the input apparatus 104 of the client apparatus 100. The digital television apparatus 4 is capable of accessing video hosting websites such as, for example, YouTube (registered trademark), and reproducing content such as music and movies. The remote keyboard processing unit 127 causes the client apparatus 100 to function as a remote operation device and keyboard device for the digital television apparatus 4. As a result, it is possible to efficiently input character strings of search keys in video hosting websites.

Further, the remote keyboard processing unit 127 is capable of requesting the digital television apparatus 4 to obtain information-on-content that is being reproduced by the digital television apparatus 4, and displaying at least part of the reply content on an application window on a display of the output apparatus 105 of the client apparatus 100.

Figure 4:
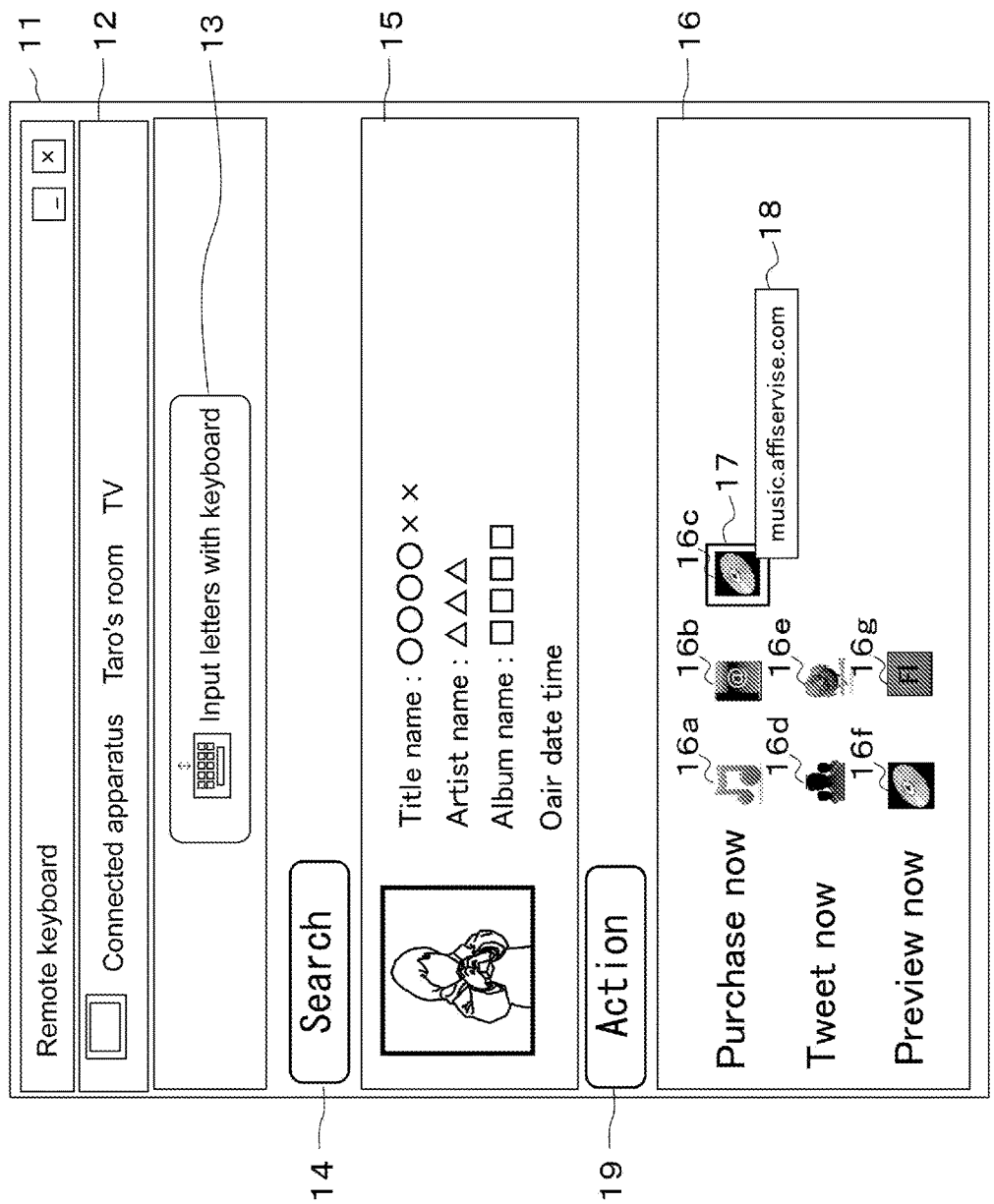
FIG. 4 is a diagram showing an example of an application window of the client apparatus of FIG. 3.

FIG. 4 is a diagram showing an example of an application window 11.

As shown in FIG. 4, the application window 11 includes information 12 on a remote-operation-target apparatus, a button 13 for changing ON/OFF of the remote keyboard, and a content-information-obtain button 14 for requesting to obtain information-on-content reproduced by a remote-operation-target apparatus (in this example, the digital television apparatus 4). Further, the application window 11 includes a content-information area 15 in which information-on-content obtained through operation of the content-information-obtain button 14 is displayed.

Further, the application window 11 includes a content-action button 19 and an icon-arrange area 16. Through operation of the content-action button 19, icons 16a, 16b, 16c, 16d, 16e, 16f, and 16g corresponding to services available for the content displayed on the content-information area 15, which a user may use in the web, are displayed in the icon-arrange area 16. In the icon-arrange area 16, the icons 16a, 16b, 16c, 16d, 16e, 16f, and 16g are sorted depending on action categories and displayed. In the example of FIG. 4, three kinds of action categories including, for example, "purchase", "share (tweet)", and "preview" are provided. Note that the kinds of the action categories are not limited to the above. The kinds of the displayed action categories may be fixed or preset corresponding to each user.

Each of the icons 16a, 16b, 16c, 16d, 16e, 16f, and 16g is in association with the corresponding service name, access information necessary to access the service (for example, HTTP query), and the like. When a focus 17 is moved on one icon through operation of the input apparatus 104, the icon operation input unit 125 recognizes it, and the name of the service corresponding to the icon is displayed as a tooltip 18. Further, in a case where a focused icon is selected through operation of the input apparatus 104, the service access unit 126 executes a system call to start the web browser 140 (see FIG. 3) by using the HTTP query, which is access information in association with the selected icon, as a parameter. The web browser 140 sends the HTTP query to a service provider server in the URL included in the HTTP query. The service provider server executes the received HTTP query, and replies the webpage for providing the service of the appropriate content and the like to the web browser 140.

Next, the cloud server will be described.
(Configuration of Cloud Server)
FIG. 5 is a block diagram showing a hardware configuration of the cloud server 200.

Figure 5:
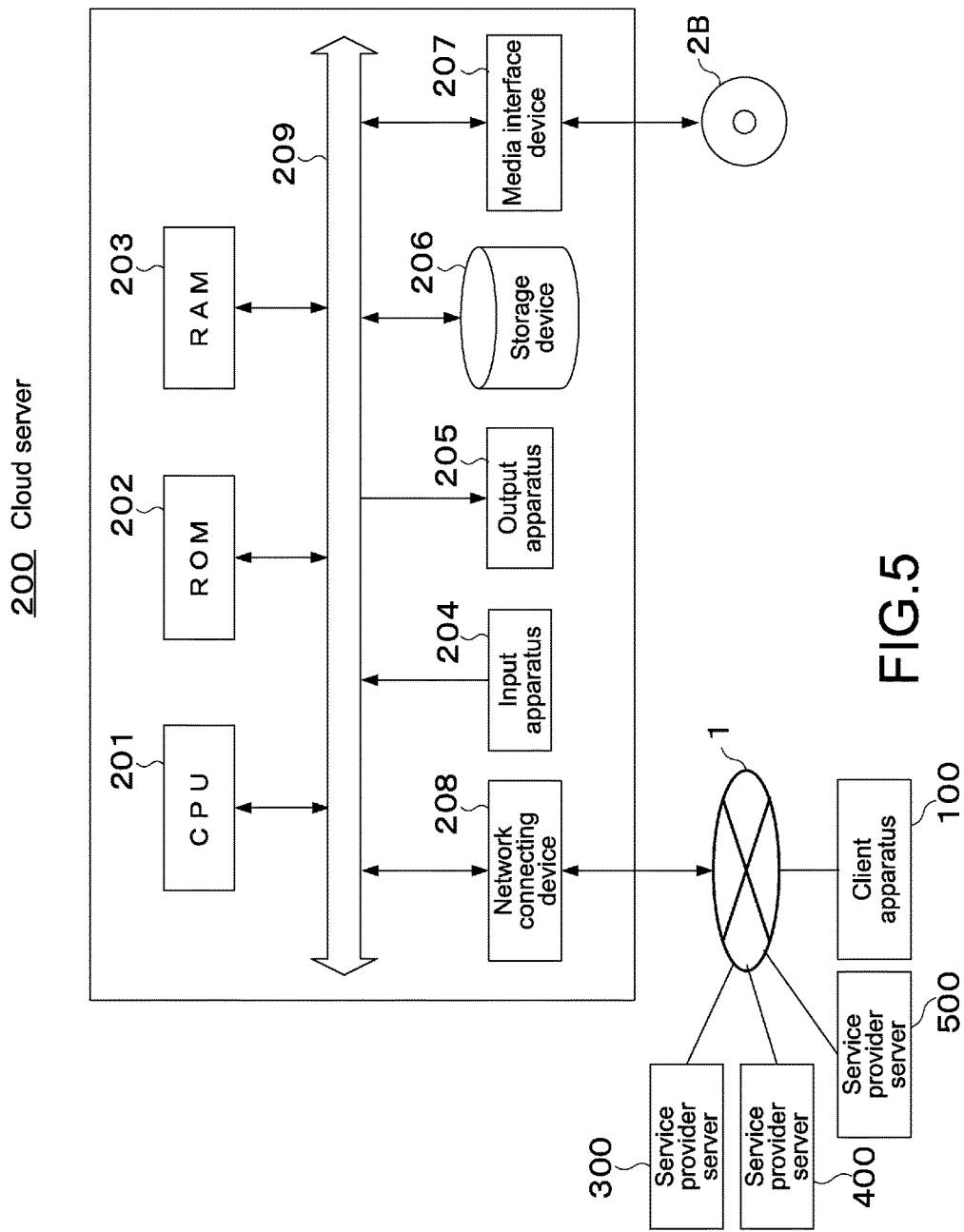
FIG. 5 is a block diagram showing the hardware configuration of a cloud server.

As shown in FIG. 5, the cloud server 200 has the configuration of the typical computer system similar to the client apparatus 100.

That is, the cloud server 200 includes a CPU 201, a ROM 202, a RAM 203, an input device 204, an output device 205, a storage device 206, a media interface device 207, a network connecting device 208, and a bus 209.

Next, the functional configuration of the cloud server 200 will be described.

Figure 6:
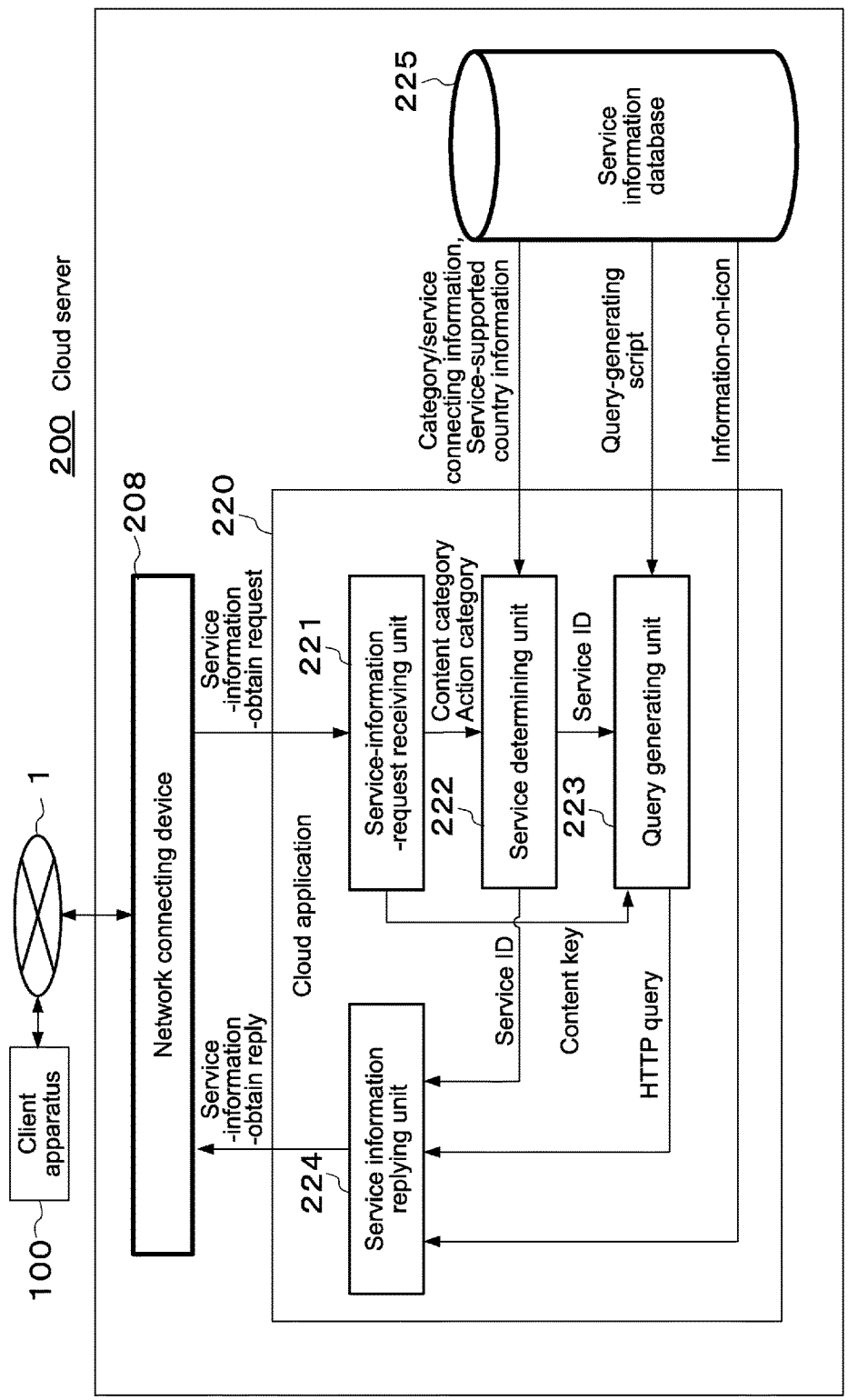
FIG. 6 is a block diagram showing the functional configuration of the cloud server of FIG. 5.

FIG. 6 is a block diagram showing the functional configuration of the cloud server 200.

As shown in FIG. 6, the cloud server 200 includes a service-information-request receiving unit 221 (request receiving unit), a service determining unit 222 (determining unit), a query generating unit 223 (first generating unit, second generating unit), a service information replying unit 224 (replying unit), and a service information database 225. They are functions implemented in a cloud application 220. The storage device 206 stores programs such as an OS, and in addition, application programs operating in the OS, such as the above-mentioned cloud application 220. Further, the service information database 225 is provided in the storage device 206 by the cloud application 220. The cloud application 220 recorded in a removable recording medium 2B is read by the media interface device 207 and installed in the storage device 206, and the cloud application 220 is thus capable of being used in the cloud server 200.

The service-information-request receiving unit 221 receives a service-information-obtain request from the client apparatus 100 via the network 1.

The service determining unit 222 searches the service information database 225 based on content-category information and action-category information in service-select information included in a received service-information-obtain request, determines a service, and notifies the query generating unit 223 and the service information replying unit 224 of the service ID of the service.

Here, the configuration of the service information database 225 will be described.

FIG. 7 is a diagram showing information stored in the service information database 225.

As shown in FIG. 7, storage service information 21, category/service connecting information 22, and service-supported country information 23 are stored in the service information database 225.

The storage service information 21 includes information on the respective one or more services. The storage service information 21 includes a set of information in relation with the respective services. Information in relation with each service includes a service ID, a service name, information-on-icon, a query-generating script, and the like. The service ID is information identifying a service. The service name is, for example, a service name that a user is capable of recognizing the service. The information-on-icon includes size information on an icon image, image data of the icon, the data format, and the like. The query-generating script is a script of the procedure for generating an HTTP query which is access information necessary to access the service.

The category/service connecting information 22 is information for connecting content-category information, action-category information, and a service ID to each other.

The following are patterns of connecting relations of the content-category information, the action-category information, and the service ID.

1. Connection of combination of content-category information and action-category information, and service ID.

2. Connection of content-category information and service ID.

3. Connection of action-category information and service ID.

More specifically, for example, the combination of the content category "music" and the action category "purchase" is in connection with the service ID of a music delivery service providing a purchasing service. The action category "share" is in connection with the service ID of a network sharing service such as, for example, an SNS (Social Networking Service) or the like, irrespective of the content category.

The service-supported country information 23 is information connecting a service to country information to which the service is provided. Note that the region to which a service is provided may be a regional unit smaller than country or a regional unit larger than country. In this case, a service and information-on-region is in connection with each other.

Returning to FIG. 6, the query generating unit 223 reads a query-generating script corresponding to the service ID notified by the service determining unit 222 out of the service information database 225. The query generating unit 223 executes the query-generating script by using a content key in the service-select information as a parameter, and thus generates an HTTP query including the content key as a search key.

The service information replying unit 224 reads information-on-icon corresponding to the service determined by the service determining unit 222 out of the service information database 225. The service information replying unit 224 generates a service-information-obtain reply at least including the information-on-icon and the HTTP query generated by the query generating unit 223 as service information, and sends back the service-information-obtain reply to the client apparatus 100.

Next, behaviors of the network system of this embodiment will be described.

The behaviors will be described in the following order.

1. Processing of service-information-obtain request executed by the client apparatus 100

2. Processing of service-information-obtain reply executed by the cloud server 200

3. Processing of icon display executed by the client apparatus 100

4. Webpage access executed by the client apparatus 100

(1. Processing of service-information-obtain request executed by the client apparatus 100)

Figure 8:
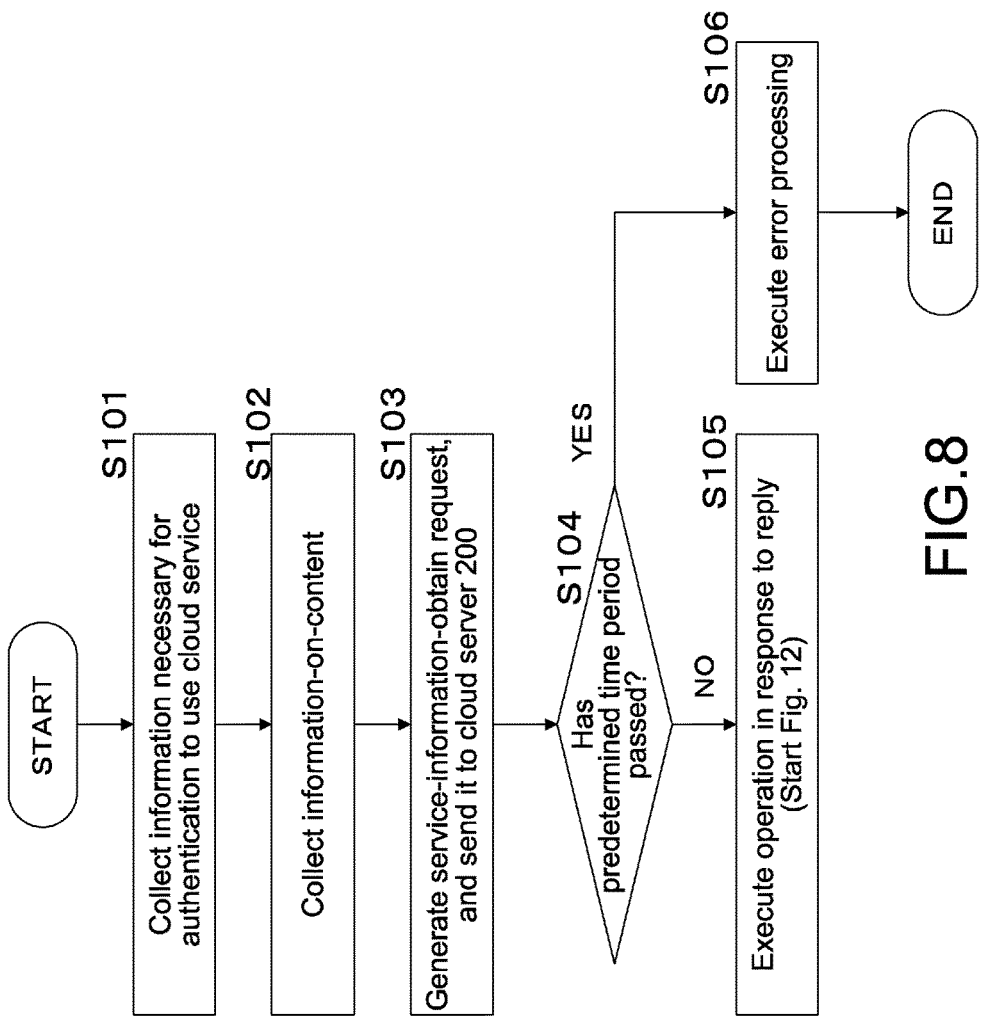
FIG. 8 is a flowchart showing processing of a service-information-obtain request by the client apparatus.

FIG. 8 is a flowchart showing processing of the service-information-obtain request executed by the client apparatus 100.

First, the content-action button 19 in the application window 11 shown in FIG. 4 is operated by a user, and an instruction to send a service-information-obtain request is thus given to the service information requesting unit 121 of the client apparatus 100.

The service information requesting unit 121 collects information necessary for authentication to use the cloud service provided by the cloud server 200 (Step S101).

The information necessary for authentication to use the cloud service includes, for example, a device type, a device ID, country information, a client application ID, and the like.

The device type is information to identify the kind of apparatus such as a personal computer, a digital television apparatus, a game device, or a model name thereof.

The device ID is an ID uniquely allocated to each apparatus.

The country information is information on an apparatus-access-source country or a locale value.

The client application ID is an ID uniquely allocated to each client application.

Note that combinations of information such as a device type, a device ID, country information, and a client application ID are registered in the cloud server 200 as information necessary for authentication of an apparatus capable of using the cloud service provided by the cloud server 200.

Next, the service information requesting unit 121 requests the remote keyboard processing unit 127 to obtain information-on-content. According to the request, the remote keyboard processing unit 127 replies the information-on-content obtained from the digital television apparatus 4 to the service information requesting unit 121 (Step S102).

Note that the information-on-content collecting method is not limited to this. For example, not the digital television apparatus 4 but the client apparatus 100 may collect information-on-content reproduced by the client apparatus 100 by using the similar method. Further, a user may manually input information-on-content. In this case, a user may manually input information-on-content when content is reproduced/not reproduced.

Next, the service information requesting unit 121 generates service-in-formation-obtain request based on information necessary for authentication to use the cloud service and on the information-on-content, and sends the service-information-obtain request to the cloud server 200 via the network 1 (Step S103).

FIG. 9 is a diagram showing an example of the service-information-obtain request.

The service-information-obtain request includes a device type (DEVICE_TYPE), a device ID (DEVICE_ID), country information (LOCALE, LANGUAGE), a client application ID (APP_ID), content-category information (CONTENT_CATEGORY), action-category information (ACTION_CATEGORY), a content key (CONTENT_KEY), a match count (MATCH_COUNT), range start (RANGE_START), and the like.

The content key is key information extracted from information-on-content such as, for example, a content ID, a title, and an artist name.

The match count is an upper limit value (limitation information) of the number of icons for each action category.

The range start is the number of service information at the time of first download. For example, the range start value "1" instructs to obtain one piece of service information first, two pieces of service information next, and three pieces of service in-formation next.

The match count and range start information is, for example, arbitrarily preset by a user, or arbitrarily set by a user every time a service-information-obtain request is generated.

The flowchart of FIG. 8 will be described again. The service information requesting unit 121 is in a standby state with respect to a reply from the cloud server 200 after the service information requesting unit 121 sends the service-information-obtain request (Step S104). The operation in a case of receiving a reply (service-information-obtain reply) from the cloud server 200 will be described later (Step S105). Further, in a case where the service information requesting unit 121 does not receive a reply from the cloud server 200 after a predetermined time period passes after the service information requesting unit 121 sends the service-information-obtain request (Step S104, YES), the service information requesting unit 121 executes error processing by, for example, displaying a dialogue to notify a user of generation of an error (Step S106), and then finishes the service-information-obtain request sending processing.

(2. Processing of service-information-obtain reply executed by the cloud server 200)

Figure 10:
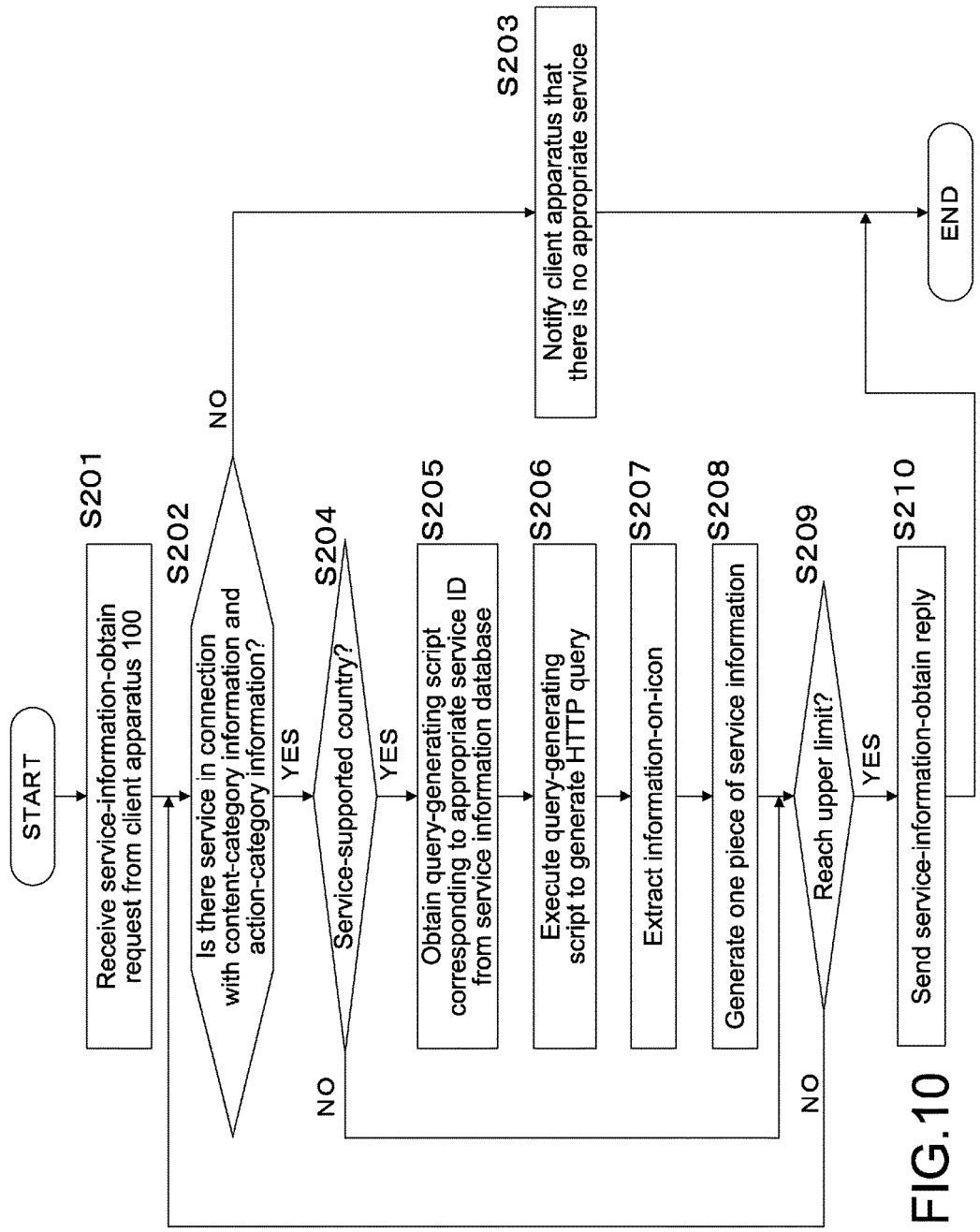
FIG. 10 is a flowchart showing processing of a service-information-obtain reply by the cloud server.

FIG. 10 is a flowchart showing service-information-obtain reply processing executed by the cloud server 200.

The service-information-request receiving unit 221 of the cloud server 200 receives a service-information-obtain request from the client apparatus 100 via the network 1 (Step S201). The service-information-request receiving unit 221 extracts service-select information out of the received service-information-obtain request, and passes the service-select information to the service determining unit 222. The service determining unit 222 extracts content-category information and action-category information out of the service-select information. The service determining unit 222 checks if there is a service in connection with the extracted content-category information and action-category information by searching the category/service connecting information stored in the service information database 225 (Step S202).

In a case where there is no appropriate service (Step S202, NO), the service determining unit 222 notifies the service information replying unit 224 of that. According to the notification, the service information replying unit 224 generates a service-information-obtain reply for notifying that there is no appropriate service, sends it back to the client apparatus 100 (Step S203), and finishes the processing of the service-information-obtain reply.

In a case where there is an appropriate service (Step S202, YES), the service determining unit 222 refers to the service-supported country information 23 stored in the service information database 225, and reads information on supported country in connection with a service ID of the appropriate service. The service determining unit 222 compares the read supported country information with country information included in the service-information-obtain request (Step S204). In a case where the supported country does not match the country information, the service determining unit 222 determines that the service is a service which may not be used in a country in which the client apparatus 100 is used. That is, the service determining unit 222 abandons the service ID of the service determined in Step S202, moves to Step S202 again, and searches for the next service. In a case where the supported country matches the country information, the service determining unit 222 determines that the appropriate service is a service which may be used in a country in which the client apparatus 100 is used. In this case, the service determining unit 222 notifies the query generating unit 223 and the service information replying unit 224 of the service ID of the service.

The query generating unit 223 obtains a query-generating script corresponding to the notified service ID from the service information database 225 (Step S205). The query generating unit 223 executes the obtained query-generating script by using a content key in service-select information included in the service-information-obtain request as a parameter. As a result, an HTTP query including a content key as a search key is generated (Step S206).

After that, the service information replying unit 224 reads information-on-icon corresponding to the service ID notified by the service determining unit 222 out of the service information database 225 (Step S207). The service information replying unit 224 generates service information corresponding to one service based on the information-on-icon and the HTTP query generated by the query generating unit 223 (Step S208).

In a case where a plurality of services are detected in response to the service-information-obtain request from the client apparatus 100 in Step S202, determination of the service-supported country (Step S204), extract of a query-generating script (Step S205), generation of an HTTP query (Step S206), extract of information-on-icon (Step S207), and generation of service information (S208) are repeated. The upper limit of the number of repeat is determined based on the match count value and the range start value set in the service-select information.

When generation of the service information is completed, the upper limit being determined based on the match count value and the range start value (Step S209, YES), the service information replying unit 224 generates a service-information-obtain reply storing all the generated service information, and sends it back to the client apparatus 100 (Step S210).

FIG. 11 is a diagram showing an example of the service-information-obtain reply.

The service-information-obtain reply stores one or more pieces of service information 31. Each service information 31 includes action-category information (ACTION_CATEGORY) 35, a service title (TITLE) 32, information-on-icon (IMAGE_SIZE, DATA_TYPE, VALUE) 33, information on HTTP query (SERVICE_QUERY, DATA_TYPE, VALUE) 34, and the like.

The information on HTTP query 34 includes "SERVICE_QUERY" indicating a query of a service, "DATA_TYPE" showing the data format of the query, "VALUE" storing a query sentence of the HTTP query, and the like. In a case where the query sentence is an HTTP query, "DATA_TYPE" showing the data format of the query is "HTTP REQUEST". The HTTP query includes a service URL, one or more search keys, and the like.

Note that there are various syntaxes of HTTP queries, and the present technology is not limited to the technology using the query syntax shown in FIG. 11. For example, as shown below, an HTTP query using a content category as a search key may be employed.

http://music.affiservice.com/
search?category=cd&keyword_ja_JP=arigato (3. Processing of icon display executed by the client apparatus 100)

Figure 12:
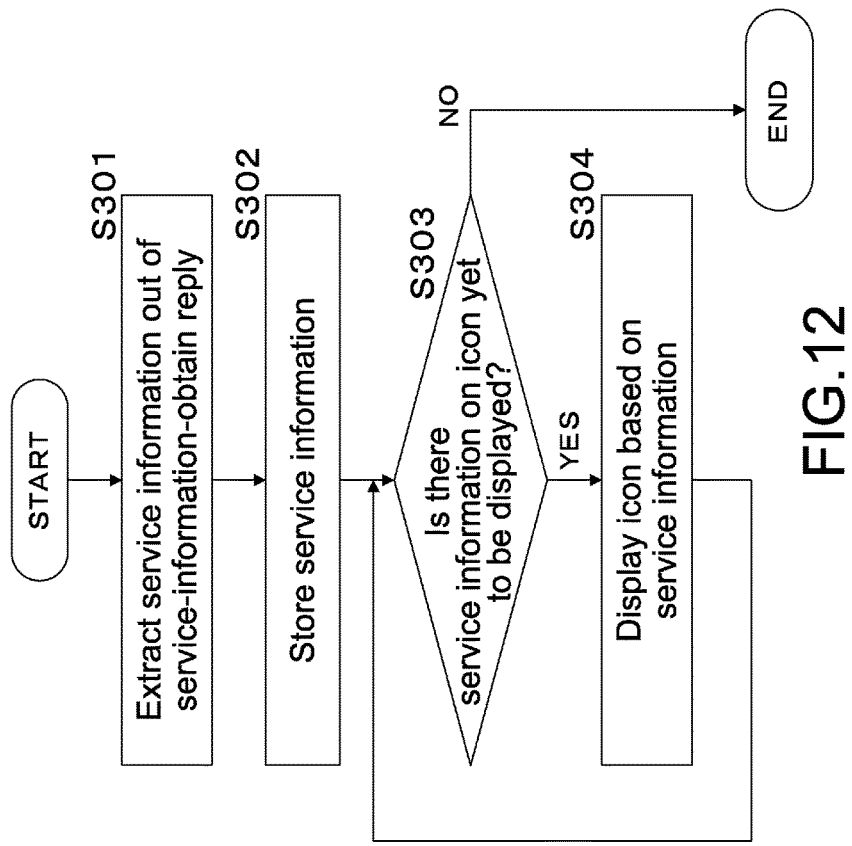
FIG. 12 is a flowchart showing icon-display processing by the client apparatus.

FIG. 12 is a flowchart showing the icon-display processing executed by the client apparatus 100.

The service information receiving unit 122 of the client apparatus 100 extracts service information out of the service-information-obtain reply received from the cloud server 200 (Step S301), and stores the service information in the service information storage 124 (Step S302).

After that, the icon generating unit 123 checks if service information including information-on-icon yet to be displayed is stored in the service information storage 124 (Step S303). In a case where there is service information including information-on-icon yet to be displayed (Step S303, YES), the icon generating unit 123 reads the service information out of the service information storage 124, and displays the icon in the icon-arrange area 16 of the application window 11 based on the service information (Step S304). As shown in FIG. 4, the icon-arrange area 16 of the application window 11 is preliminarily divided into areas for the respective action categories. Based on action-category information set in the service information, the icon generating unit 123 displays the icon in the area corresponding to the action category. With respect to all the service information stored in the service information storage 124, the above-mentioned icon-display processing is repeated.

(4. Access to service by the client apparatus 100)

Figure 13:
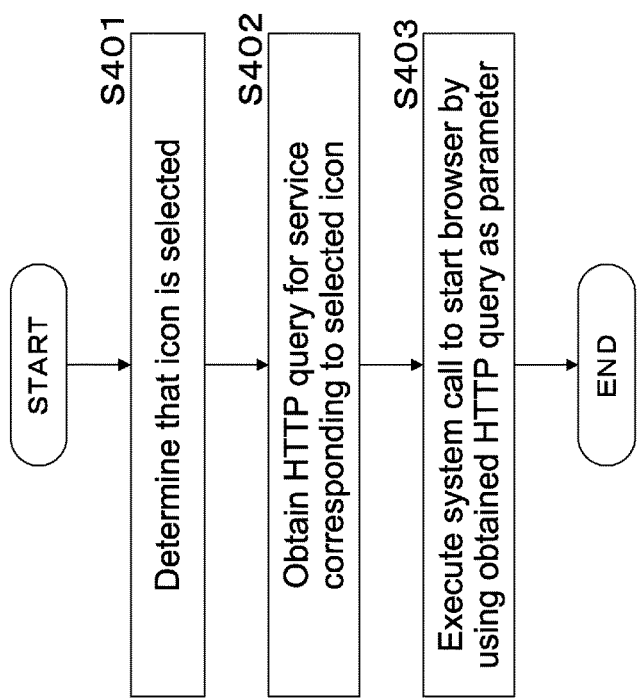
FIG. 13 is a flowchart showing access to a service by the client apparatus.

FIG. 13 is a flowchart showing access to a service by the client apparatus 100.

The service access unit 126 of the client apparatus 100 determines that an icon in the icon-arrange area 16 of the application window 11 is selected by a user (Step S401), and then obtains an HTTP query for a service corresponding to the selected icon from the service information storage 124 (Step S402).

The service access unit 126 executes a system call to start the web browser 140 by using the obtained HTTP query as a parameter (Step S403). As a result, the web browser 140 is started. The web browser 140 sends the HTTP query to a service provider server of the URL included in the HTTP query. The service provider server executes the received HTTP query, and replies a webpage for providing a service of the appropriate content and the like to the web browser 140.

As described above, according to this embodiment, the following effects are provided.

1. The client apparatus 100 is capable of displaying an icon of a service available for designated content.

2. In a case where a service is changed, it is not necessary to change the client application 120 of the client apparatus 100. That is, in this embodiment, the cloud server 200 changes content of the service information database 225, and thus it is possible to handle the service changes greatly flexibly and swiftly. Since change of the client application 120 is not necessary, it is not necessary to distribute a new-version application and the like, and it is thus possible to cut cost for managing the client application 120. Further, in the client apparatus 100, an icon which may not be used to access a service is not displayed, and operability for user is stabled.

3. Without changing the client application 120 of the client apparatus 100 depending on countries, availability/non-availability for use of a service may be changed depending on countries in which the client apparatuses 100 are used for each service unit. As a result, it is not necessary to provide different client applications 120 depending on countries. From this point of view also, it is possible to cut cost for managing the client application 120.

<Second Embodiment>

This embodiment relates to a cloud server which may used in a case where a plurality of services having different action categories are provided in one website, the website is searched for a service by using a content key, and a service provided by a service provider server capable of replying a result including an HTTP query with respect to the retrieved service is used.

Figure 14:
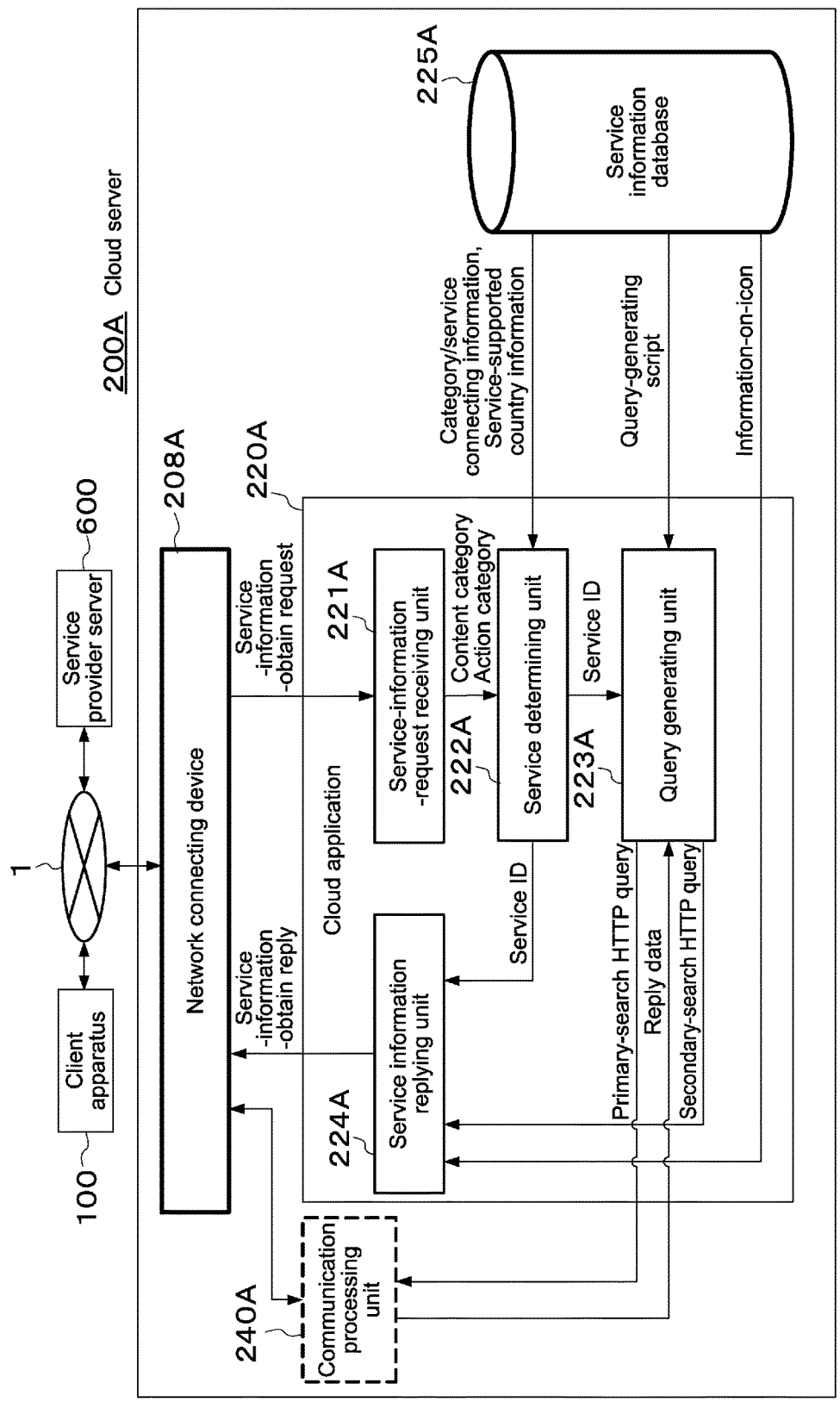
FIG. 14 is a block diagram showing the functional configuration of a cloud server according to a second embodiment of the present technology.

FIG. 14 is a block diagram showing the functional configuration of a cloud server 200A according to a second embodiment. The cloud server 200A is different from the cloud server 200 of the first embodiment mainly in the function of a query generating unit 223A.

Figure 15:
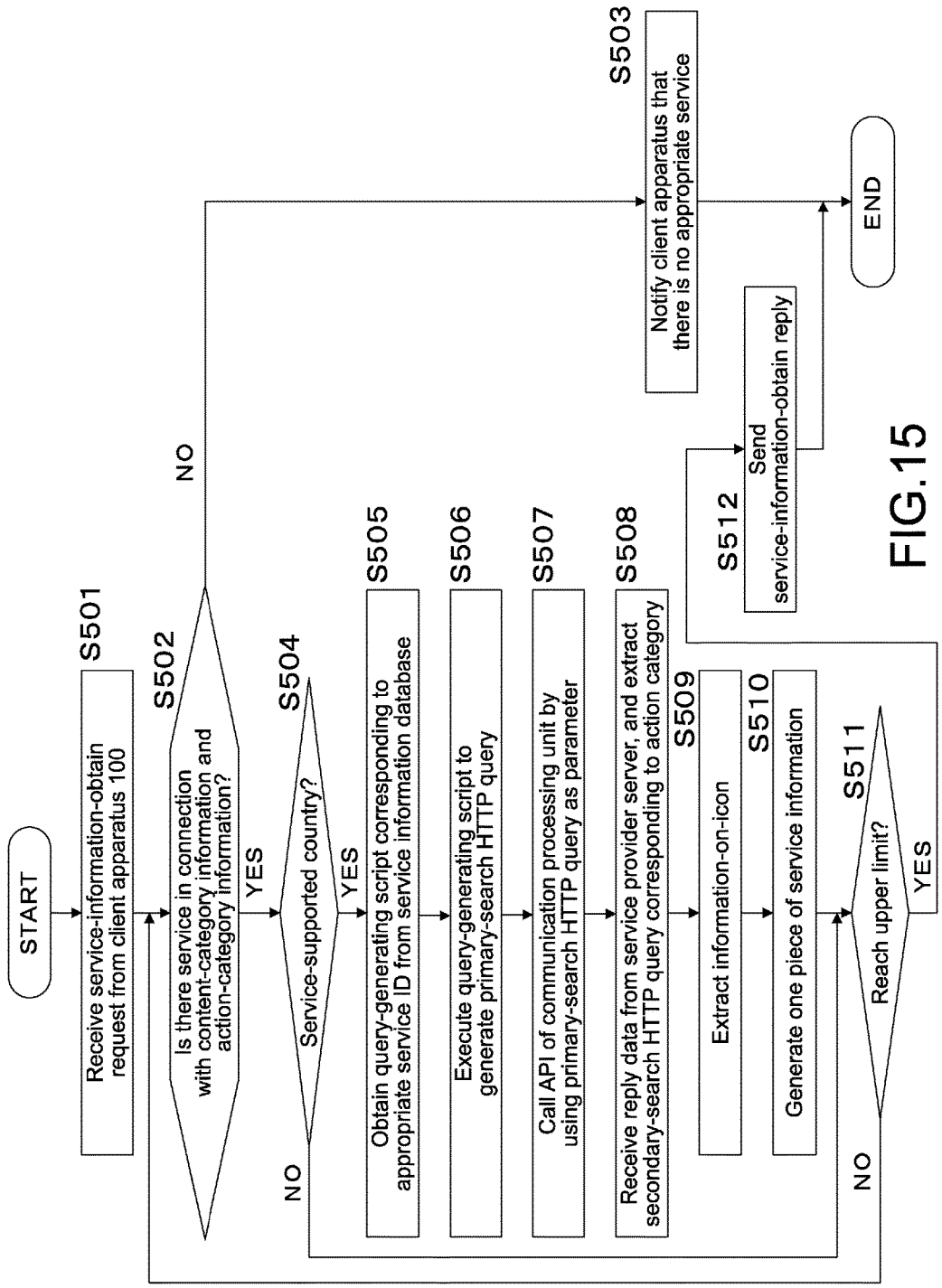
FIG. 15 is a flowchart showing processing of a service-information-obtain reply by the cloud server of FIG. 14.

FIG. 15 is a flowchart showing processing of service-information-obtain reply executed by the cloud server 200A of FIG. 14.

Here, Step S501 to Step S506 are basically similar to the behaviors of Step S201 to Step S206 of the first embodiment shown in FIG. 10, and description will thus be omitted.

The query generating unit 223A uses the HTTP query generated in Step S506 as a primary-search HTTP query. The query generating unit 223A calls the API of a communication processing unit 240A by using the primary-search HTTP query as a parameter (Step S507). As a result, the communication processing unit 240A sends the primary-search HTTP query. Here, the communication processing unit 240A is a software asset built in a communication library (class library of API in which sockets and upper layer protocols are programmed, and the like) or an OS (Operating System).

The primary-search HTTP query is, for example, as follows. http://music.affiservice.com/Search/wsSearch?term=PPPQQQ12345+arigato That is, a primary-search HTTP query including "PPPQQQ12345" and "arigato" as search terms is executed with respect to the API (Application Program Interface) for searching for a service of a service provider server 600.

In the service provider server 600, the service-search API searches a website for one or more services in relation with a content key, generates reply data including one or more secondary-search HTTP queries corresponding to the one or more services, respectively, and sends it back to the cloud server 200A. The communication processing unit 240A receives the reply data, and replies it to the query generating unit 223A.

FIG. 16 is a diagram showing an example of the reply data from the service provider server 600.

Here, the reply data includes two secondary-search HTTP queries 41 and 42 corresponding to services of two action categories "purchase" and "preview", respectively.

The query generating unit 223A of the cloud server 200A extracts the secondary-search HTTP query for searching for a service corresponding to the action category designated by a service-information-obtain request out of the reply data, and supplies it to a service information replying unit 224A (Step S508). The service information replying unit 224A reads information-on-icon corresponding to the service ID notified by a service determining unit 222A out of a service information database 225A (Step S509). The service information replying unit 224A generates service information corresponding to one service based on the information-on-icon and the secondary-search HTTP query generated by the query generating unit 223A (Step S510).

Behaviors thereafter are similar to those of the first embodiment.

That is, in a case where a plurality of services are detected in response to the service-information-obtain request from the client apparatus 100 in Step S502, the processing from determination of service-supported country (Step S504) to generation of service information (Step S510) are repeated, the upper limit of the number of repeat being determined based on the match count value and the range start value set in the service-select information. Then, when the generation of service information is completed, the upper limit being determined based on the match count value and the range start value (Step S511, YES), the service information replying unit 224A generates a service-information-obtain reply storing all the generated service information, and sends it back to the client apparatus 100 (Step S512).

As described above, according to this embodiment, the effects similar to those of the first embodiment may be obtained in the case where a plurality of services having different action categories are provided in one website, the website is searched for a service by using a content key, and a service provided by a service provider server capable of replying a result including an HTTP query with respect to the retrieved service is used.

MODIFIED EXAMPLE 1

(Modified Example of Service Information)

In the above-mentioned embodiments, when an icon corresponding to a service is selected in the client apparatus, the web browser accesses the service by using an HTTP query or a secondary-search HTTP query. However, the present technology is not limited to this. For example, in place of query, the cloud server may supply access information necessary to access a webpage such as a URL of a service homepage or the like as service information to the client apparatus.

MODIFIED EXAMPLE 2

(Timing to Obtain Service Information by Client Apparatus)

In the first embodiment, when the content-information-obtain button 14 in the application window 11 shown in FIG. 4 is operated, the cloud server provides service information to the client apparatus. The following other methods may be employed.

1. A method of setting action-category information and executing obtain processing of service information immediately after the start of the client application or immediately after the start of the client apparatus, and other methods may be employed. According to this method, it is possible to obtain service information in the shortest period of time after the start of the client application or after the start of the client apparatus, and to make the first access to the service further swiftly.

2. A method of sending, at a time when content or a content category selected by a user is changed, by the client apparatus, service-information-obtain request including service-select information in which content-category information is set, to the cloud server, executing obtain processing of the service information, storing the obtained service information, and adding icons may be employed. According to this method, it is possible to preferentially add icons corresponding to services belonging to content categories in tune with user's tastes.

3. If service information once obtained is used for a long time, the freshness of the service information declines, and there is a possibility that icons showing unavailable services, in fact, occupy a display space. In view of the above, a method of setting the effective period of the obtained service information, automatically deleting service information that is out of its effective period, executing obtain processing of service information again, and replacing the service information with the latest service information may be employed.

Note that, the present technology may employ the following configurations:

(1) An apparatus including:
a receiving unit configured to receive a request for service information from an information processing apparatus via a network;
a determining unit configured to determine the service information based on the request, where the service information includes information associated with accessing a service and display object information on a display object corresponding to the service; and
a reply unit configured to send the service information to the information processing apparatus.

(2) The apparatus according to (1), wherein the receiving unit receives the request including a type of the information processing apparatus, a device ID of the information processing apparatus, a country of the information processing apparatus, and an application ID of an application of the information processing apparatus.

(3) The apparatus according to (1) or (2), wherein the determining unit determines the service information including a query generating script for generating an HTTP query to access the service.

(4) The apparatus according to (1) to (3), wherein the determining unit determines the display object information on the display object corresponding to the service including an icon image corresponding to the service.

(5) The apparatus according to (1) to (4), wherein the reply unit sends display object information including text to the information processing apparatus.

(6) The apparatus according to (5), wherein the reply unit sends display object information including an icon to the information processing apparatus, and the information processing apparatus only displays the text when a cursor of the information processing apparatus is on the icon.

(7) The apparatus according to (1) to (6), further comprising: a storage unit configured to store the service information.

(8) The apparatus according to (1) to (7), wherein the receiving unit receives the request including information on content, the information on content including a category of content and a search key used to search for content.

(9) The apparatus according to (8), wherein the receiving unit receives the request including a search key used to search for content.

(10) The apparatus according to (8), wherein the receiving unit receives the request including a category of content.

(11) The apparatus according to (8), wherein the receiving unit receives the request including an action category.

(12) The apparatus according to (8), wherein the receiving unit receives the request including information on a region of the information processing apparatus.

(13) The apparatus according to (1) to (12), wherein the receiving unit receives the request including content and an action category for the content.

(14) The apparatus according to (1) to (13), wherein the receiving unit receives the request including information limiting a number of pieces of information.

(15) A method including:
receiving a request for service information from an information processing apparatus via a network;
determining, using a processor, the service information based on the request, where the service information includes information associated with accessing a service and display object information on a display object corresponding to the service; and sending the service information to the information processing apparatus.

(16) A non-transitory computer readable medium encoded with a program that, when loaded on a processor, causes the processor to perform a method including:
receiving a request for service information from an information processing apparatus via a network;
determining, using a processor, the service information based on the request, where the service information includes information associated with accessing a service and display object information on a display object corresponding to the service; and sending the service information to the information processing apparatus.

(17) An apparatus including:
a sending unit configured to send a request for service information to a server via a network;
a receiving unit configured to receive the service information including information associated with accessing a service and display object information on a display object corresponding to the service from the server;
a display unit configured to display the display object information; and
a service access unit configured to access the service.

CROSS-REFERENCE TO RELATED APPLICATIONS

The present application is based upon and claims the benefit of priority under 35 U.S.C. S 119 of Japanese Priority Patent Application JP 2011-146173 filed in the Japanese Patent Office on Jun. 30, 2011, the entire contents of which are hereby incorporated by reference.

The invention claimed is:

1. An apparatus comprising:
    circuitry configured to
        receive a request for service information from an information processing apparatus via a network, the service information including a content category and a plurality of service categories associated with the content category,
        generate a primary web-browser query based on the received service information,
        determine at least one service providing server based on the generated primary web-browser query, each determined service providing server providing services corresponding to at least a subset of the service categories associated with the content category,
        generate a secondary web-browser query for each service category associated with the content category, based on the information processing apparatus being an authorized device that can access services corresponding to the each service category,
        transmit a service response information to the information processing apparatus, the service response information including display object information for a predetermined number of objects corresponding to each service category associated with the content category, and
        update periodically, the transmitted service response information.

2. The apparatus according to claim 1, wherein the request for service information includes a type of the information processing apparatus, a device ID of the information processing apparatus, a country of the information processing apparatus, and an application ID of an application of the information processing apparatus.

3. The apparatus according to claim 2, wherein the circuitry is further configured to
    determine whether the country of the information processing apparatus is a service supported country, and
    transmit the service response information to the information processing apparatus only upon a successful determination of the country of the information processing apparatus being a service supported country.

4. The apparatus according to claim 1, wherein the circuitry generates the primary web-browser query as an HTTP query based on a query generating script to access the service.

5. The apparatus according to claim 1, wherein the display object information includes an icon image for each of the predetermined number of objects corresponding to each service category.

6. The apparatus according to claim 1, wherein the circuitry is further configured to transmit display object information including text to the information processing apparatus.

7. The apparatus according to claim 6, wherein the circuitry is further configured to transmit display object information including an icon to the information processing apparatus, and the information processing apparatus is configured to display the text only when a cursor of the information processing apparatus is positioned on the icon.

8. The apparatus according to claim 1, further comprising:
    a storage device configured to store the service information.

9. The apparatus according to claim 1, wherein the request for service information includes a search key used to search for content category.

10. The apparatus according to claim 9, wherein the circuitry receives the request for service information including information on a region of the information processing apparatus.

11. The apparatus according to claim 1, wherein the circuitry receives the request for service information including information limiting a number of pieces of information.

12. The apparatus according to claim 1, wherein the service response information includes the generated secondary web-browser query and display object information includes size information of each of the display objects corresponding to the service category.

13. The apparatus according to claim 1, wherein the circuitry is further configured to display, on a display panel of the information processing apparatus, an icon for each of the display objects corresponding to the service category, the icon being used to access the available service.

14. The apparatus according to claim 1, wherein the circuitry is further configured to:
    verify, availability of service for each service category of the plurality of service categories associated with the content category; and
    modify, based on the verification, service information corresponding to each service category that is stored in a storage device.

15. A method comprising:
    receiving a request for service information from an information processing apparatus via a network, the service information including a content category and a plurality of service categories associated with the content category;
    generating a primary web-browser query based on the received service information;
    determining by circuitry, at least one service providing server based on the generated primary web-browser query, each determined service providing server providing services corresponding to at least a subset of the service categories associated with the content category;
    generating a secondary web-browser query for each service category associated with the content category, based on the information processing apparatus being an authorized device that can access services corresponding to the each service category;
    transmitting a service response information to the information processing apparatus, the service response information including display object information for a predetermined number of objects corresponding to each service category associated with the content category; and
    updating periodically, the transmitted service response information.

16. A non-transitory computer readable medium encoded with a program that, when loaded on a processor, causes the processor to perform a method comprising:
    receiving a request for service information from an information processing apparatus via a network, the service information including a content category and a plurality of service categories associated with the content category;

generating a primary web-browser query based on the received service information;

determining at least one service providing server based on the generated primary web-browser query, each determined service providing server providing services corresponding to at least a subset of the service categories associated with the content category;

generating a secondary web-browser query for each service category associated with the content category, based on the information processing apparatus being an authorized device that can access services corresponding to the each service category;

transmitting a service response information to the information processing apparatus, the service response information including display object information for a predetermined number of objects corresponding to each service category associated with the content category; and updating periodically, the transmitted service response information.

* * * * *